(12) United States Patent
Fromme

(10) Patent No.: US 10,954,035 B2
(45) Date of Patent: Mar. 23, 2021

(54) CELLPHONE COUPLABLE CONTAINER ASSEMBLY

(71) Applicant: Sarah Fromme, Miami, FL (US)

(72) Inventor: Sarah Fromme, Miami, FL (US)

( * ) Notice: Subject to any disclaimer, the term of this patent is extended or adjusted under 35 U.S.C. 154(b) by 0 days.

(21) Appl. No.: 16/827,688

(22) Filed: Mar. 23, 2020

(65) Prior Publication Data
US 2020/0299030 A1 Sep. 24, 2020

Related U.S. Application Data

(60) Provisional application No. 62/822,818, filed on Mar. 23, 2019.

(51) Int. Cl.
*B65D 23/12* (2006.01)
*A45F 3/16* (2006.01)
*B65D 41/04* (2006.01)
*B65D 55/16* (2006.01)

(52) U.S. Cl.
CPC .............. *B65D 23/12* (2013.01); *A45F 3/16* (2013.01); *B65D 41/04* (2013.01); *B65D 55/16* (2013.01)

(58) Field of Classification Search
CPC .. B65D 2313/04; B65D 23/001; B65D 23/12; B65D 25/22; A47J 45/02; A47G 19/2205; A47G 23/0225; A45F 3/16
See application file for complete search history.

(56) References Cited

U.S. PATENT DOCUMENTS

| 4,287,676 A * | 9/1981 | Weinhaus ................. G09F 7/18 248/206.5 |
| 5,186,350 A * | 2/1993 | McBride ............ A47G 23/0233 206/818 |
| 6,837,407 B1 | 1/2005 | Towers |
| 9,084,468 B2 | 7/2015 | Conwell |
| 9,980,439 B2 * | 5/2018 | Aller ........................ A01G 9/02 |
| 2008/0149589 A1 | 6/2008 | Lach |
| 2016/0198877 A1 | 7/2016 | Ni |
| 2016/0236819 A1 * | 8/2016 | Yurkovetskaya ....... A47J 45/02 |
| 2017/0166346 A1 | 6/2017 | Cornell |

FOREIGN PATENT DOCUMENTS

WO 2016081387 A1 5/2016

* cited by examiner

*Primary Examiner* — Andrew T Kirsch
(74) *Attorney, Agent, or Firm* — Baker Donelson

(57) ABSTRACT

A cellphone couplable container assembly having a portable and reusable container operably configured to store liquid contents within an internal cavity while simultaneously retaining a cellphone or other similar electronic device magnetically selectively attached to the exterior of the portable container. In one embodiment, a plurality of magnets with ferromagnetic properties are disposed on the outer shell of the cellphone couplable container assembly and are proportionately shaped and sized to correspond to a cellphone magnet disposed on a user's cellphone. Additional protrusions may provide additional structural support for a more secure of the cellphone to the cellphone couplable container assembly.

14 Claims, 13 Drawing Sheets

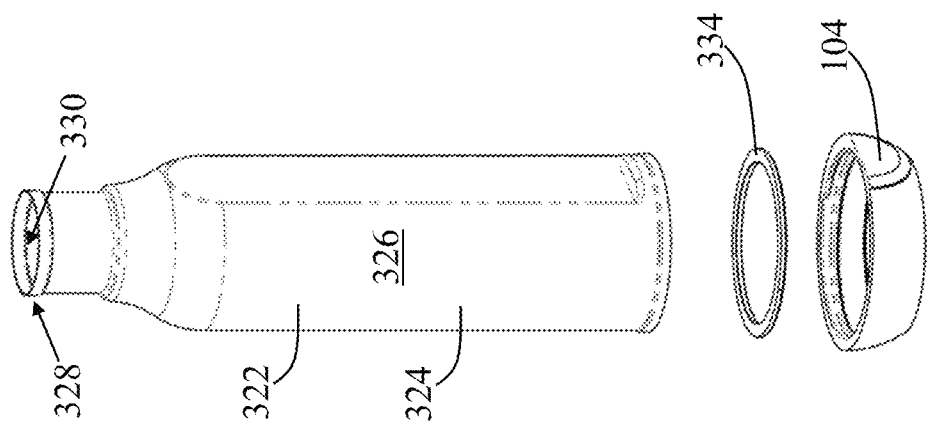
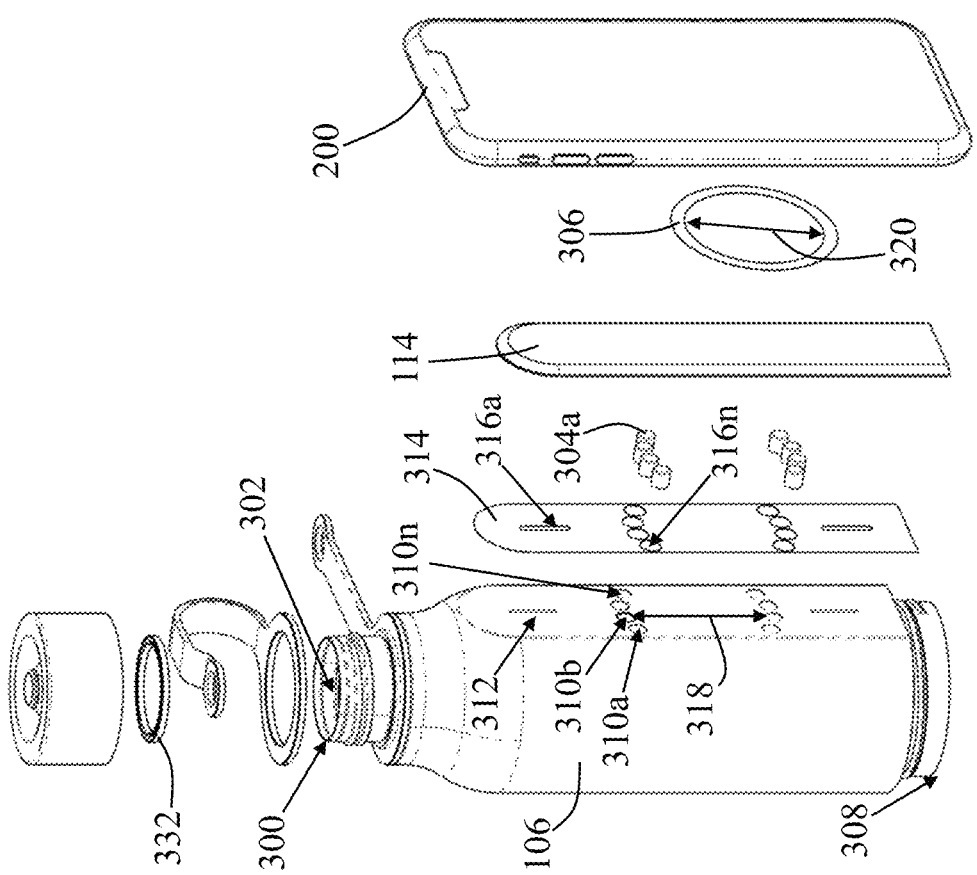
FIG. 3b
FIG. 3a

CELLPHONE COUPLABLE CONTAINER ASSEMBLY

CROSS-REFERENCE TO RELATED APPLICATION

This application claims priority to U.S. Provisional Patent Application No. 62/822,818, filed Mar. 23, 2019, the entirety of which is incorporated herein by reference.

FIELD OF THE INVENTION

The present invention relates generally to portable containers and, more particularly, relates to portable containers operably configured to store liquid contents within an internal cavity while simultaneously retaining a cellphone or other similar electronic device magnetically selectively attached to the exterior of the portable container.

BACKGROUND OF THE INVENTION

Generally, consumers wishing to take both their reusable portable containers and their cellphones with them must manually carry both. Their options are few and include fitting both items in one hand, which can make for an unsecure hold that makes both items susceptible to being dropped and damaged or broken. In the alternative, users can either carry one item in each hand or put both items in a bag, backpack, or other transportation assembly for secure transportation. The former option serves as a substantial detriment to consumers, leaving them with a limited ability to use their hands for anything other than carrying the items. The latter option is not always a viable one, particularly when consumers are going to certain locations like fitness centers.

In fitness centers, or while exercising in general, consumers typically rely on cellphones to play music, watch workout videos, record exercises and stay connected to texts and emails, and therefore require accessibility to their cellphones. However, it is uncomfortable and often dangerous to store one's cellphone on his or her person. For example, the cellphone can easily fly out of one's pocket, or inhibit full range of motion on weightlifting exercises. Additionally, storing one's cellphone in his/her pocket can put the phone at risk for breakage due to contact with barbells, dumbbells and other exercise equipment. Workout garments, such as ladies leggings and men's running shorts do not always have pockets, making the issue of where to store one's phone even more of an issue. Even when a consumer does have pockets or a means of storing his/her phone on his/her person, he/she often chooses to place the phone on bacteria-ridden floors, mats, or equipment to avoid the disruption to his/her exercise described above. Placing cellphones on the floor and/or equipment is unsanitary and leaves the phone vulnerable to breakage and theft. Additionally, reusable gym bottles are often used for protein and other supplements, leaving behind residual powder on threading, particularly at the base, that results in bacteria buildup and unpleasant odor, rendering the bottle unsanitary and unpleasant to use.

Some known containers may enable a user to attach a cellphone thereto, but it does so in an inefficient and ineffective manner. For example, said containers do not allow users to safely and effectively retain, remove, and/or use the user's cellphone or allow unobstructed access to the display of the cellphone while attached to the container. Additionally, said containers do not allow users to quickly and effectively orient and position the user's cellphone on the container. Furthermore, said containers also do not permit the user to effectively clean and otherwise utilize the container for its intended purpose.

Therefore, a need exists to overcome the problems with the prior art as discussed above.

SUMMARY OF THE INVENTION

The invention provides a cellphone couplable container assembly that overcomes the hereinafore-mentioned disadvantages of the heretofore-known devices and methods of this general type and that is structurally configured to house a liquid and retain a cellphone thereon in an effective and efficient manner. Specifically, the magnetic configuration of the container assembly facilitates the selective and secure attachment of a cellphone to the container assembly in such a way that users have the freedom to carry both in one, while maintaining accessibility to the phone. The orientation of the cellphone may be selectively adjusted to better suit the function of the cellphone by the user, e.g. if a user is watching a video or other media on the cellphone, the user may turn the cellphone to a horizontal orientation while it remains coupled to the container assembly. In this way, the user is able to watch the media playing on the cellphone hands-free and at a distance and location convenient to the user.

With the foregoing and other objects in view, there is provided, in accordance with the invention, a cellphone couplable assembly comprising an outer shell having a sidewall and defining an enclosed aperture and container cavity wherein liquid contents are housed. At least one sidewall magnet is directly coupled to the sidewall and has a magnetic field generating at least approximately 15 lbf in pull strength.

In accordance with another feature, an embodiment of the present invention includes a lid selectively removably couplable to the outer shell and operably configured to cover the enclosed aperture.

In accordance with a further feature of the present invention, a cellphone magnet having an adhesive and a polarity opposite the polarity of the at least one sidewall magnet, is disposed on a user's cellphone and is operably configured to selectively removably couple to the outer shell through the at least one sidewall magnet.

In accordance with a further feature of the present invention, an outer surface of the sidewall defines a substantially planar surface spanning longitudinally and at least 50% of a sidewall length.

In accordance with a further feature of the present invention, a sidewall panel with a substantially planar outer surface is operably configured to adhesively couple to the substantially planar surface of the outer surface of the sidewall.

Although the invention is illustrated and described herein as embodied in a cellphone couplable container assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cellphone couplable container assembly, i.e., from the lower end to the top end of the container assembly. The term "traverse" should be understood to mean in a direction horizontally across the cellphone couplable container assembly.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 3a and 3b are exploded views of the cellphone couplable container assembly in FIG. 2;

DETAILED DESCRIPTION

Figure 1:
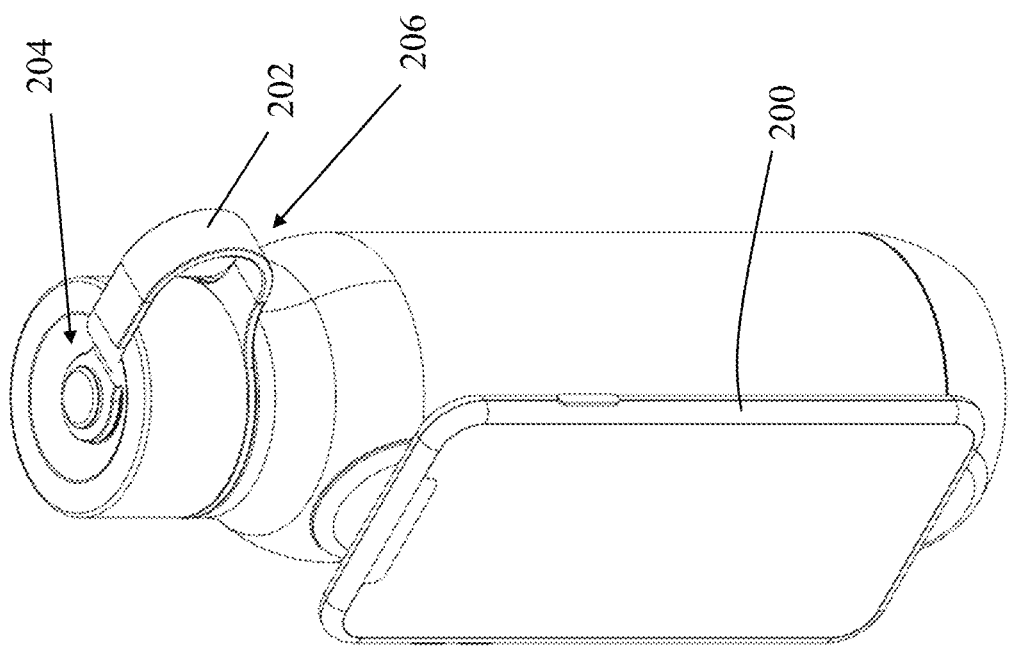
FIG. 1 is a perspective view of a cellphone couplable container assembly in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient assembly for housing liquid contents in a reusable and portable cellphone couplable container assembly 100. Embodiments of the invention provide for the easy, convenient, and secure transportation and use of a user's cellphone via the selective magnetic attachment of the cellphone to the cellphone couplable container assembly 100.

It should be understood that while the term "cellphone" 200 is utilized, said term shall be defined as a portable electronic device with a display. In some embodiments, the cellphone may include a case selectively removably couplable thereto.

Figure 2:
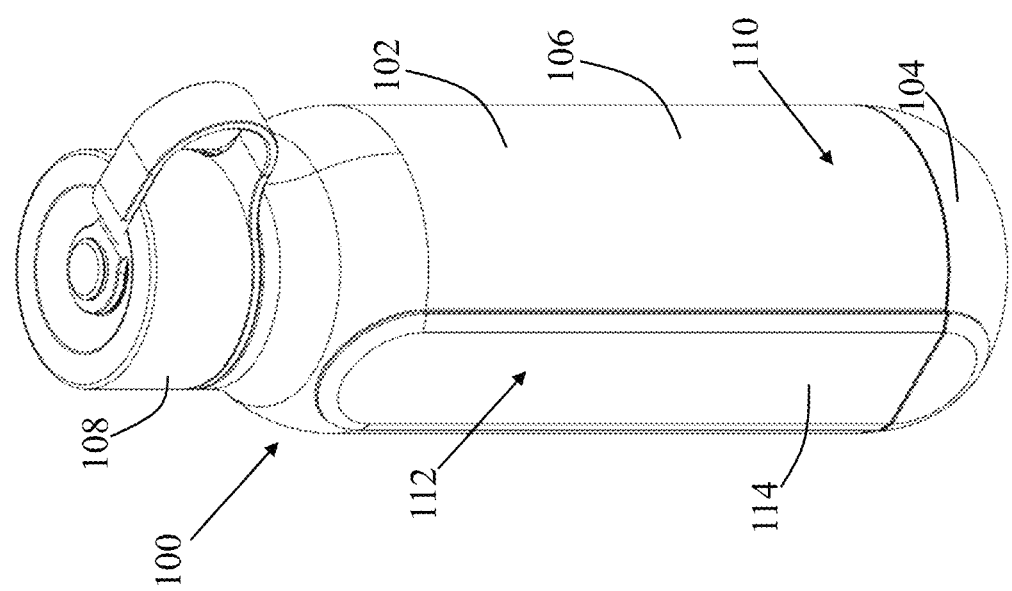
FIG. 2 is a perspective view of the cellphone couplable container assembly in FIG. 1 with a cellphone selectively removably coupled thereto.
Figure 4:
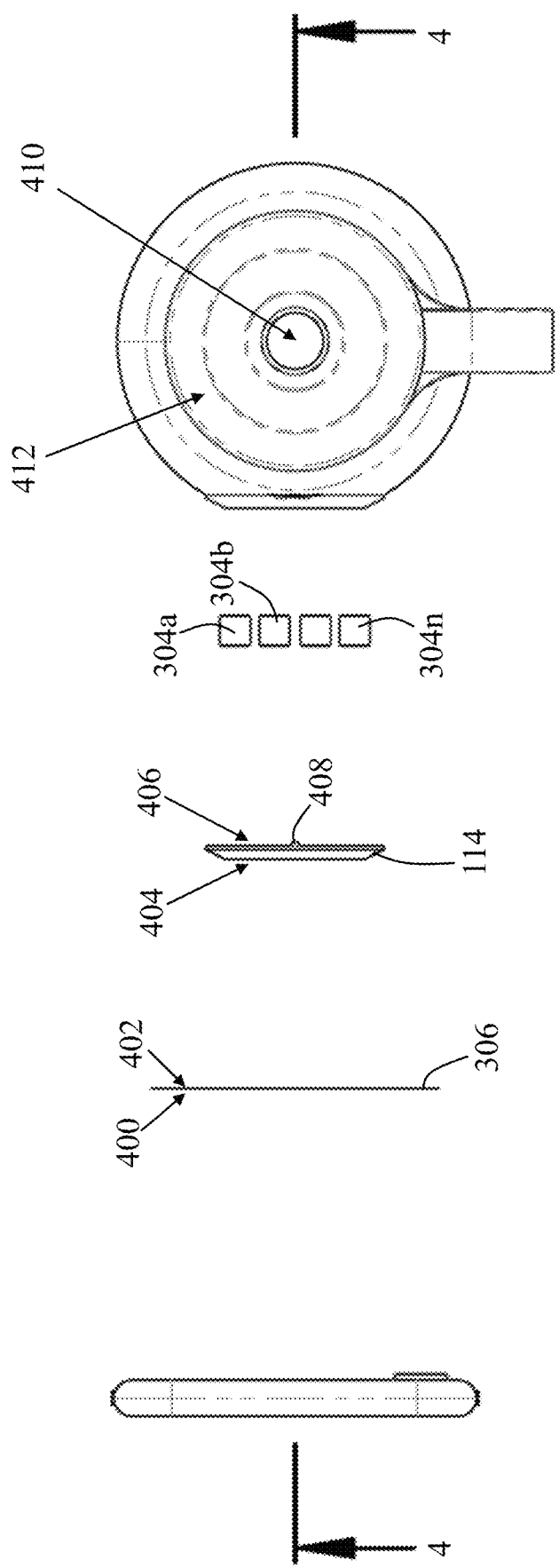
FIG. 4 is a top plan exploded view of the cellphone couplable container assembly in FIG. 2.

Referring now to FIGS. 1-2, one embodiment of the present invention is shown in perspective views. The figures depicted herein show several advantageous features of the present invention, but, as will be described below, the invention can be provided in several shapes, sizes, combinations of features and components, and varying numbers and functions of the components. The first example of a cellphone couplable container assembly 100, as shown in FIGS. 1-2, includes an outer shell 102 having a bottom wall 104 and a sidewall 106 surrounding the bottom wall 104. The outer shell 102 further comprises an upper end 300 (as best seen in FIG. 3) defining an enclosed aperture 302. In exemplary embodiments, the outer shell 102 is of a stainless-steel material composition and weighs approximately 190.8 grams, though the material composition and weight of the outer shell 102 may vary in different embodiments and still be within the scope of the present invention. The diameter of the outer shell 102 is also advantageously sized to fit within most conventional cup holders, i.e., 3-4 inches.

Figure 5:
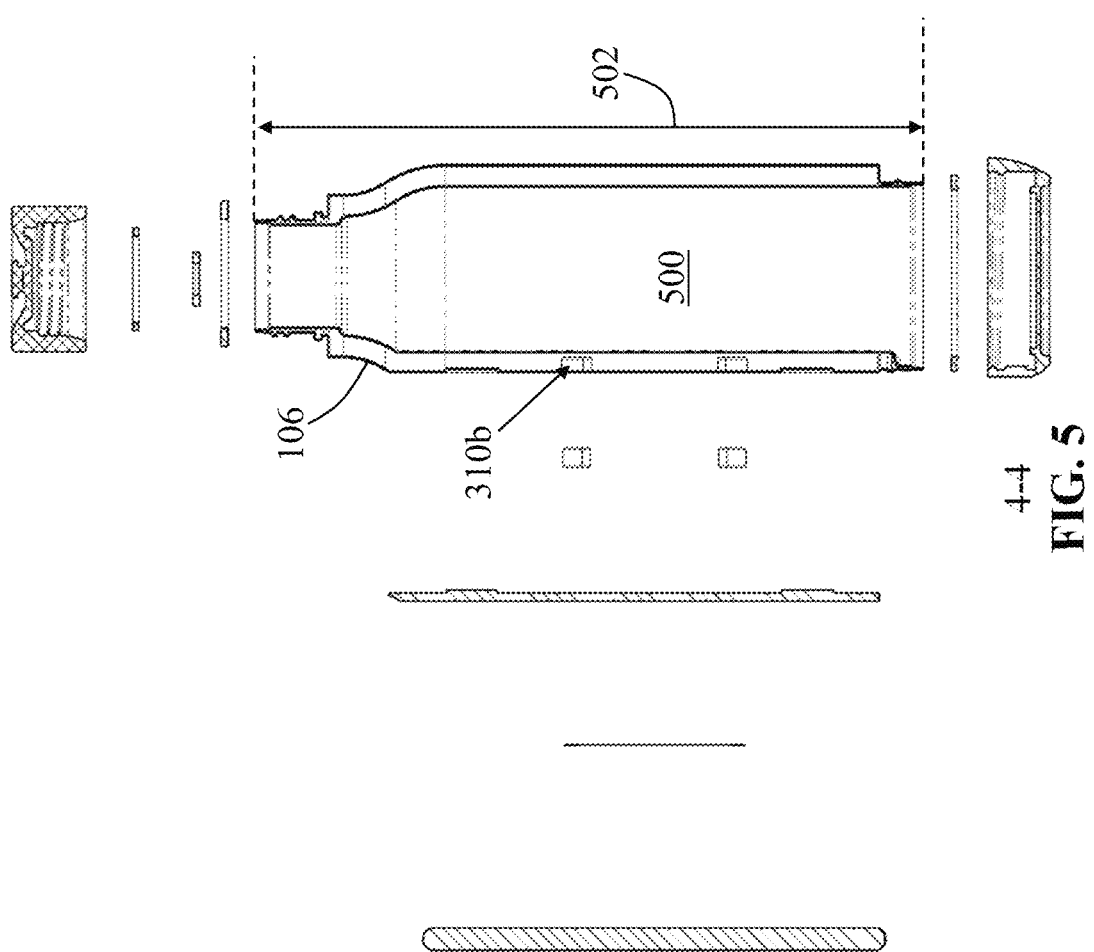
FIG. 5 is an elevational side exploded view of the cellphone couplable container assembly in FIG. 2.
Figure 6B:
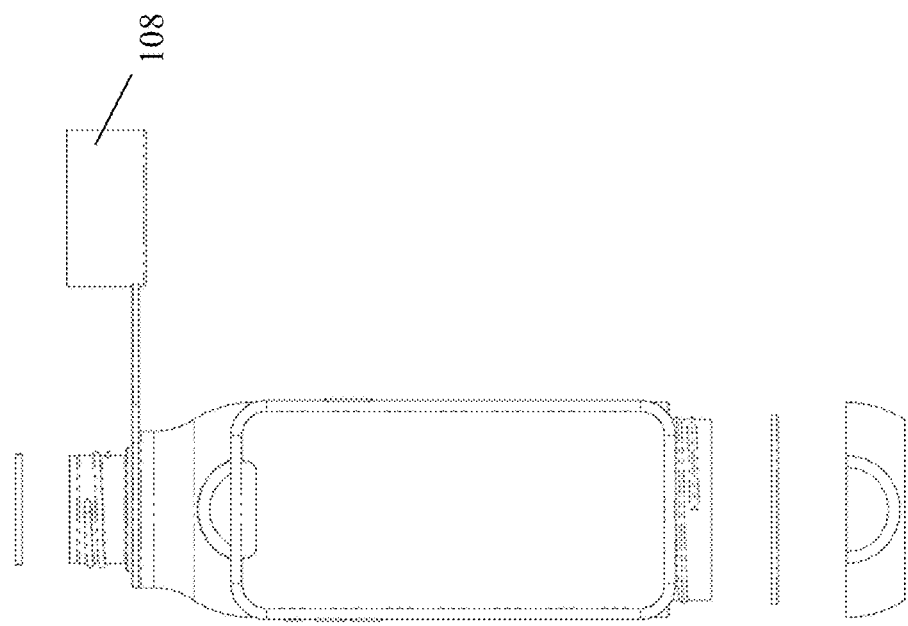
FIG. 6b is an elevational side exploded view of the cellphone couplable container assembly in FIG. 1.
Figure 6A:
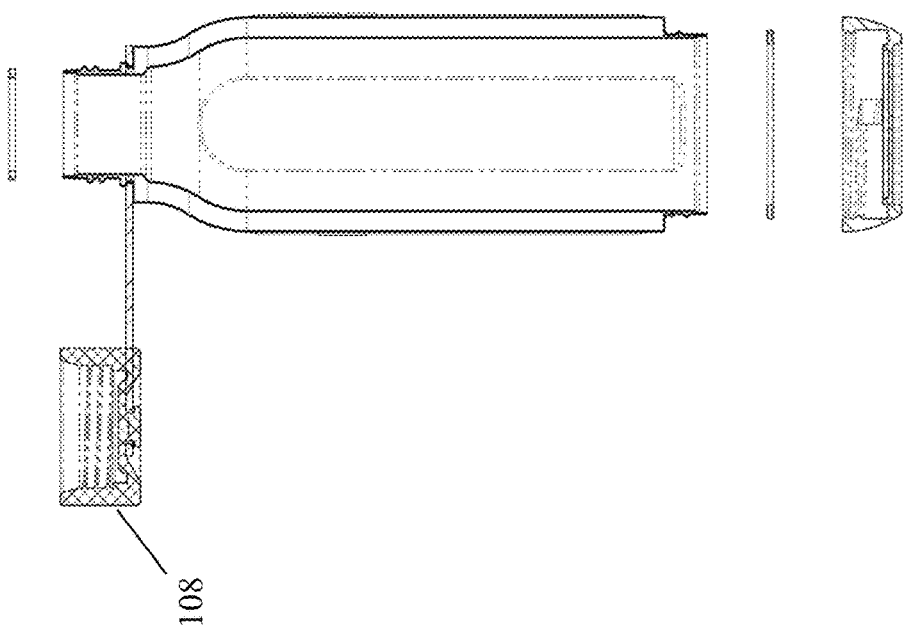
FIG. 6a is an elevational side exploded and cross-sectional view of the cellphone couplable container assembly in FIG. 1.

As seen in FIG. 1, FIG. 3, and FIG. 5, the bottom wall 104 and the sidewall 106 of the outer shell 102, namely the inner surfaces thereon, define a container cavity 500. In some embodiments, the container cavity 500 may be designed to house a user's liquid contents directly therein. In an exemplary embodiment and as best seen in FIG. 3, the container cavity 500 may also be designed to house an inner shell 322 having a sidewall 324 and that is coupled to the outer shell 102 and disposed within and defining the container cavity 500. In one embodiment, the inner shell 322 is housed within the container cavity 500 and the liquid contents are housed within the inner shell cavity 326. The inner shell 322 may also be selectively removably couplable or fixed in its disposition within the container cavity 500. A selectively removably couplable inner shell 322 facilitates an easier reach into, and cleaning of, the inner shell cavity 326 by the user. In other embodiments, the cellphone couplable container assembly 100 may entirely lack an inner shell 322, in which case the outer shell 102 would achieve the function of the inner shell 322. Whether utilized with an inner shell 322 or outer shell 102, the inner surface thereon may be beneficially unobstructed by the container's ability to retain a cellphone. Said another way, the inner surface of either inner or outer shells 332, 102 that defines the cavity 500 may be formed without any protrusions or recesses thereon that some known containers utilize to house the cellphone. Said differently, the inner surface of either inner or outer shells 332, 102 that defines the cavity 500 may be of a cylindrical shape and otherwise resemble the shape and have the volumetric capacity as conventional containers not configured to retain a cellphone thereon.

In those exemplary embodiments with the cellphone couplable container assembly 100 having an inner shell 322, the material composition of the inner shell 322 may also be of a stainless-steel or other substantially rigid material. Stainless steel generally refers to an alloy of iron with a minimum of approximately 10.5% chromium and has favorable properties for outdoor use without degradation of the container. Furthermore, the inner shell 322 may have an approximate weight of 145.16 grams. The weight of the container 100 advantageously enables the container to support the weight of the cellphone 200 with or without the fluid housed therein. The inner and outer shells 322, 102 may be shaped and sized to facilitate in inserting and removing the inner shell 322 within the outer shell 322. The inner and outer shells 322, 102 may have a tapered neck portion and the inner shell 322 may also include an upper end 328 defining an upper enclosed aperture 330. The upper end 328 of the inner shell 322 preferably terminates proximal to the upper end 300 of the outer shell 102. The inner shell 322 also beneficially prevents condensation forming on the outer surface of the outer shell 102 because the two may be vacuum sealed together with space in between. Thus, the container assembly 100 will prevent the cellphone 200 from getting wet for over twelve hours.

As best seen in FIG. 1 and FIG. 3, the sidewall 106 of the outer shell 102 further comprises an outer surface 110 and a lower end 308 opposing the upper end 300 of the sidewall 106. A sidewall length 502 separates the lower end 308 and the upper end 300 of the sidewall 106. In an exemplary embodiment, the outer surface 110 of the sidewall 106 defines a substantially planar surface 112 spanning longitudinally and at least 50% of the sidewall length 502. The percentage may vary in different embodiments, but it is preferably a minimum of 50% of the sidewall length 502 to ensure a secure and steady magnetic hold on the cellphone. In some embodiments, the substantially planar surface 112 of the outer surface 110 of the sidewall 106 spans at least 80% of the sidewall length 502. In one embodiment, the sidewall length 502 may be approximately 6-8 inches. In other embodiments, the sidewall length 502 may vary outside of said range. The substantially planar surface 112 also prevents the container assembly 100 rolling 360° about its outer surface 110. To that end, in one embodiment of the present invention, the outer surface 110 may include a plurality of substantially planar surfaces 112 configured as described above and separated apart from one another around a circumference of the outer shell 102. In one embodiment, the plurality of substantially planar surfaces 112 may be equally spaced apart from one another.

The sidewall 106 beneficially has at least one sidewall magnet 304a directly coupled thereto. The at least one sidewall magnet 304a has a first polarity and a magnetic field generating at least approximately 15 lbf in pull strength. Pull strength is defined as the highest possible holding power of a magnet and can also be thought of as the force required to pry a magnet away from a flat steel surface when the magnet and metal have full and direct surface-to-surface contact. In exemplary embodiments, the at least one sidewall magnet 304a is a neodymium magnet, generally defined as a permanent magnet made from an alloy of neodymium, iron, and boron, and each one having a pull force greater than 3 lbf. In preferred embodiments, the magnetic field of the at least one sidewall magnet 304a generates at least approximately 25 lbf in pull strength, thereby enabling sufficient retention of the cellphone on the sidewall 106 regardless the orientation of the cellphone (e.g., horizontal, vertical or other orientations).

The cellphone couplable container assembly 100 further comprises a lid 108 selectively removably couplable to the outer shell 102 and operably configured to cover the enclosed aperture 302 and encapsulate, with the outer shell 102, the container cavity 500. The lid 108 serves to restrict the free movement of the liquids housed within the container cavity 500 to the container cavity 500 when the lid 108 is securely affixed to the upper end 300 of the sidewall 106. In an exemplary embodiment, and as best seen in FIGS. 1-4, the lid 108 comprises a lid coupler 202 which provides users with an easier grip on the entire cellphone couplable container assembly 100 and retains the lid 108 to the outer shell 102 of the container assembly 100. The lid coupler 202 may have a portion of a semi-annular, or ring-like, shape wherein the upper end 204 of the lid coupler 202 is affixed to a circular central surface 410 defined atop the top surface 412 of the lid 108. The lower end 206 of the lid coupler 202 is attached to the upper end 300 of the sidewall 106. Part or all of the lid coupler 202 may be selectively removably coupled to the cellphone couplable container assembly 100, for cleaning or replacement. The lid 108 may also include a polymeric (e.g., rubber) seal 332 enabling a watertight connection between the lid 108 and the outer shell 102 when coupled together (e.g., using a threaded or other coupling connection).

In accordance with one embodiment of the present invention, a cellphone magnet 306 is employed to selectively removably couple the cellphone 200 with the outer shell 102. The cellphone magnet 306 includes a first side surface 400 having an adhesive disposed thereon and a second side surface 402, opposite the first side surface 400, of a second polarity opposite the first polarity of the at least one sidewall magnet 304a, thereby enabling attraction thereof. In one embodiment, the first side surface 400 may include a release liner selectively removably coupled thereto. The cellphone magnet 306 may also be of a metallic tape or other material having magnetic properties (i.e., the ability to generate a magnetic field of a polarity opposite to that of the sidewall magnet(s) 304a-n). The cellphone magnet 306 is operably configured to be selectively removably coupled to the outer shell 102 through the at least one sidewall magnet 304a. In other words, the magnetic pull between the cellphone magnet 306, affixed to the cellphone, and the at least one sidewall magnet 304a, affixed to the cellphone couplable container assembly 100, serves the function of joining the cellphone 200 to the outer shell 102 of the cellphone couplable container assembly 100. By pulling the cellphone 200 (with the cellphone magnet 306 coupled thereto) away from the at least one sidewall magnet 304a, a user may selectively remove the cellphone 200 from the outer shell 102 of the cellphone couplable container assembly 100. The sidewall magnet(s) 304a-n also enable the container to selectively couple to other metallic materials operably configured to generate a magnetic field.

In accordance with another embodiment, the at least one sidewall magnet 304a and the cellphone magnet 306 are permanent magnets and/or of a ferromagnetic material. Ferromagnetic materials are defined as those substances, such as iron, that can possess magnetization in the absence of an external magnetic field and that, when placed in an external magnetic field, are strongly magnetized in the direction of the field. This property of the at least one sidewall magnet 304a and the cellphone magnet 306 guarantees that that two elements magnetically join together and magnetize toward one another when in close proximity. In another embodiment, the at least one sidewall magnet 304a may be an electromagnet electrically coupled to a power source (e.g., a lithium-ion battery) and a switch (e.g., located on the lid 108 or the outer shell 102).

In other embodiments, the cellphone magnet 306 is of an annular shape. As best seen in FIG. 3, the present invention employs a plurality of sidewall magnets 304a-n, wherein "n" refers to any number greater than one. The plurality of sidewall magnets 304a-n are affixed to the outer shell 102 and may be positioned and evenly spaced from one another in such a way that they form an annular or circular outline on the outer shell 102. This annular or circular outline depicted in the figures is intended to correspond in approximate shape and size to the cellphone magnet 306. A proportionate and corresponding overlay between the circular and/or annular outline formed by the at least one sidewall magnet 304a-n and the cellphone magnet 306 guarantees that the magnetic pull force between the two elements is aligned and effective, thereby securely holding the cellphone in place against the cellphone couplable container assembly 100.

As seen best in FIG. 3, the plurality of sidewall magnets 304a-n are separated from one another to define a sidewall magnet diameter 318, wherein the cellphone magnet 306 defines a cellphone magnet diameter 320 corresponding to the sidewall magnet diameter 318. The sidewall magnet diameter 318 and the cellphone magnet diameter 320 correspond in length in such a way that, when placed in close proximity, the magnetic pull force of the one or more sidewall magnets 304a-n and the cellphone magnet 306 attracts and pulls the cellphone 200 and the outer shell 102 of the cellphone couplable container assembly 100 together.

In some embodiments, the plurality of sidewall magnets 304a-n are disposed on the outer shell 102 in an opposing circular configuration and the cellphone magnet 306 is of an annular, or ring-like, shape, to facilitate a corresponding fit and outline between the magnets and ensure proper placement for optimum magnetization between the cellphone 200 and the outer shell 102 of the cellphone couplable container assembly 100. In turn, this facilitates a more secure magnetic pull between the plurality of sidewall magnets 304a-n and the cellphone magnet 306 and a secure hold of the cellphone 200 thereon.

In one exemplary embodiment, the plurality of sidewall magnets 304a-n are each respectively disposed in a plurality of sidewall magnet cavities 310a-n defined by and recessed in the outer shell 102. At least one sidewall support cavity 312 is defined by and recessed in the outer shell 102. The plurality of sidewall magnet cavities 310a-n are preferably of a shape and size corresponding to the shape and size of the plurality of sidewall magnets 304a-n, wherein the plurality of sidewall magnet cavities 310a-n are able to receive the plurality of sidewall magnets 304a-n and form a snug and secure fit around the same.

In accordance with a further feature of the present invention, a sidewall panel 114 with a substantially planar outer surface 404 and with an inner surface 406, opposing the outer surface 404 of the sidewall panel 114, is adhesively coupled to the substantially planar surface 112 on the outer surface 110 of the sidewall 106. The substantially planar outer surface 404 is designed to be substantially flat or two-dimensional in order to facilitate a close and even selectively removable magnetic attachment of the cellphone to the substantially planar outer surface 404 of the sidewall panel 114. Said another way, the substantially planar outer surface 404 enables the cellphone 200 to slide longitudinally along the outer shell 102 to a desired height, along with facilitating in rotating the cellphone 200 (e.g., 360°) when retained on the outer shell 102. In an exemplary embodiment, the sidewall panel 114 is of a thermoplastic polyurethane material, generally known in the industry as TPU, referring to a class of polyurethane plastics with many properties, including elasticity, transparency, and resistance to oil, grease and abrasion. The material of the sidewall panel 114 may also be of a non-conductive material that does not affect the magnetic field generated by the one or more sidewall magnets 304a-n. The sidewall panel 114 may of an approximate shore 50A hardness value, wherein shore hardness value refers to the hardness of the material.

An adhesive transfer tape 314 may facilitate the adhesive coupling of the sidewall panel 114 to the substantially planar surface 112 on the outer surface 110 of the sidewall 106. The adhesive transfer tape 314 may be of a high-temperature resistance and may define a plurality of cutouts 316*a*-*n* corresponding in shape and size to receive a shape and size of at least one of the plurality of sidewall magnets 304*a*-*n* and at least one support protrusion 408. The at least one support protrusion 408 extend outwardly away from the inner surface 406 of the sidewall panel 114, the at least one sidewall support cavity 312 sized and shaped to receive the at least one support protrusion 408. The at least one support protrusion 408 provides additional structural support ensuring a snug and secure fit between the cellphone and the cellphone couplable container assembly 100.

In some embodiments, the bottom wall 104 is selectively removably coupled to the outer shell 102 in a watertight configuration using, for example, a polymeric (e.g., rubber) seal 334. When attached to the outer shell 102, the bottom wall 104 forms a watertight configuration that prevents the liquid contents therein from leaking or spilling therefrom. In some embodiments, the bottom wall 104 may be selectively removable to facilitate a better reach into the container cavity 500, particularly to empty out the liquid contents therein or to effectively and efficiently clean or sanitize the container cavity 500. In one embodiment, a portion of the bottom wall 104 may be selectively removed (similar to a plug) from the remainder of the housing to access the cavity 500.

In one embodiment, the bottom wall 104 or other portion of the housing (that may include the inner and outer shells 322, 102) may be configured to store snacks, powder or another substance for use by the user. If stored in the bottom wall 104, for example, the storage cavity may be selectively fluidly uncouplable to the cavity 500 (e.g., using a cover). Another part of the outer shell 102 may include wireless charging capability by incorporating or embedding a wireless cellphone charger therein and in a charging position configured by the magnet configuration. In additional embodiments of the present invention, the outer shell 102 may include a tripod accessory coupled thereto. The tripod accessory may be selectively extendable to enable selective adjustment of the container (and cellphone) for viewing or placement purposes.

Figure 7B:
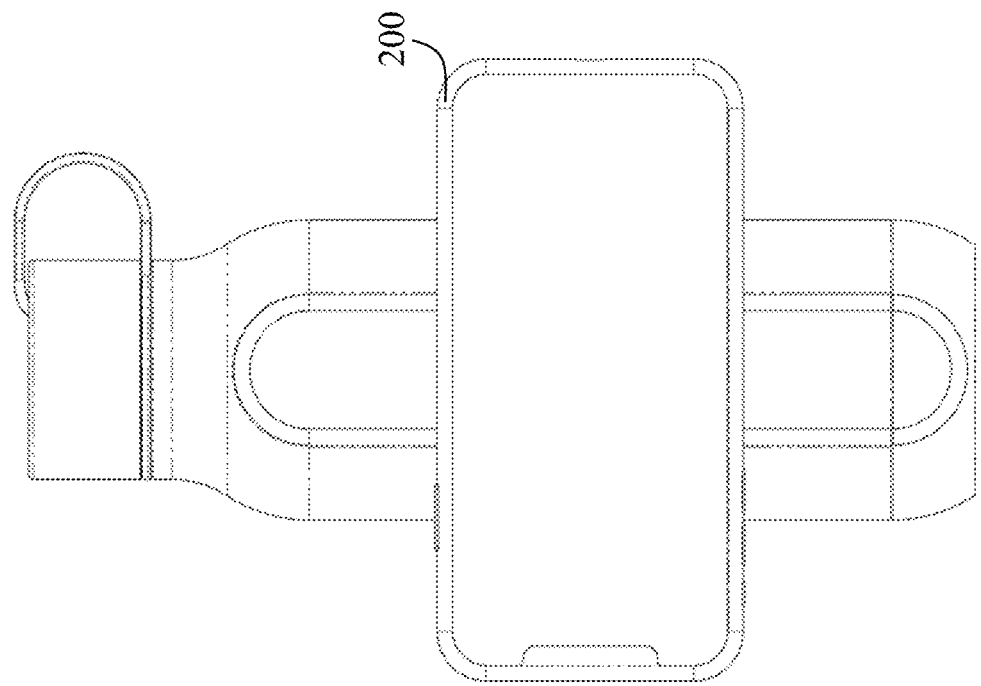
FIGS. 7a and 7b are elevational side views of the cellphone couplable container assembly in FIG. 1 with the cellphone in various orientations and configurations.
Figure 7A:
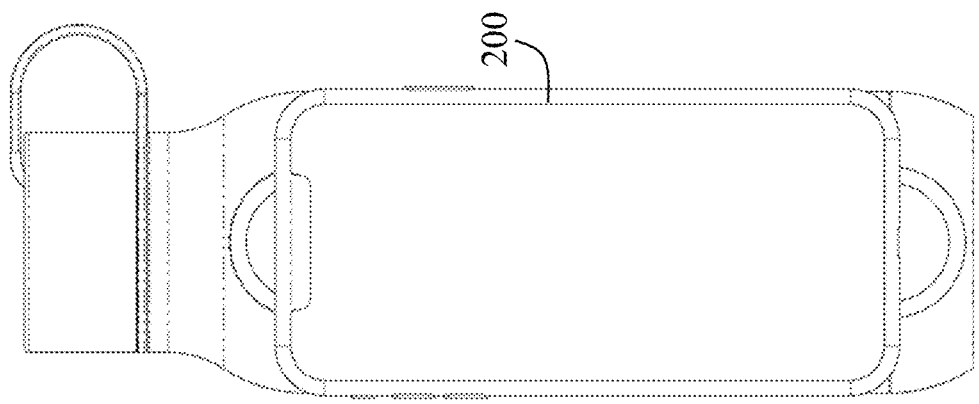

As best seen in FIGS. 7*a*-7*b* with reference to FIGS. 1-2, the configuration of the sidewall panel 114 and the outer surface 110 of the sidewall 106 enables the user to selectively adjust the orientation of the cellphone 200 to suit the needs of the individual user. By way of just one example, FIG. 7*b* depicts a horizontal orientation, wherein a user may view multimedia material on the cellphone hands-free, freeing up the user to conduct other tasks while the multimedia material is playing and while the cellphone couplable container assembly securely holds the cellphone in place. FIG. 7*a* depicts a vertical orientation of the phone. Other orientations are envisioned and within the scope of the present invention. FIGS. 1-7 and FIGS. 14-17 depict an advantageous embodiment of the present invention utilizing a unique magnetic structure configuration, whereby the user's cellphone can translate on the outer surface and orient to a desired position, all while being able to effectively, quickly, and safely retain and remove the cellphone while in use.

As seen in FIGS. 8-13, different embodiments of the present invention, but are also effective in coupling the user's cellphone to the container. FIGS. 8-13 are fragmentary and sometimes schematic views of containers. As such, those of skill in the art will appreciate that other components and features describe above with reference to FIGS. 1-6 may also be utilized for the containers depicted in FIGS. 8-13. For example, FIG. 8*a* depicts a protruding portion 800 on an outer shell of the container forming a recess corresponding in shape and size to a protruding member on a cellphone support magnet 802 adhesively coupled to the rear surface of a cellphone. The specific dimensions, forms, shapes, and sizes of the protruding portion 800 and the cellphone support magnet 802 may differ, but their intended function of providing additional structural support to lock the cellphone into place against the outer shell, magnetically, remain the same.

Figure 8B:
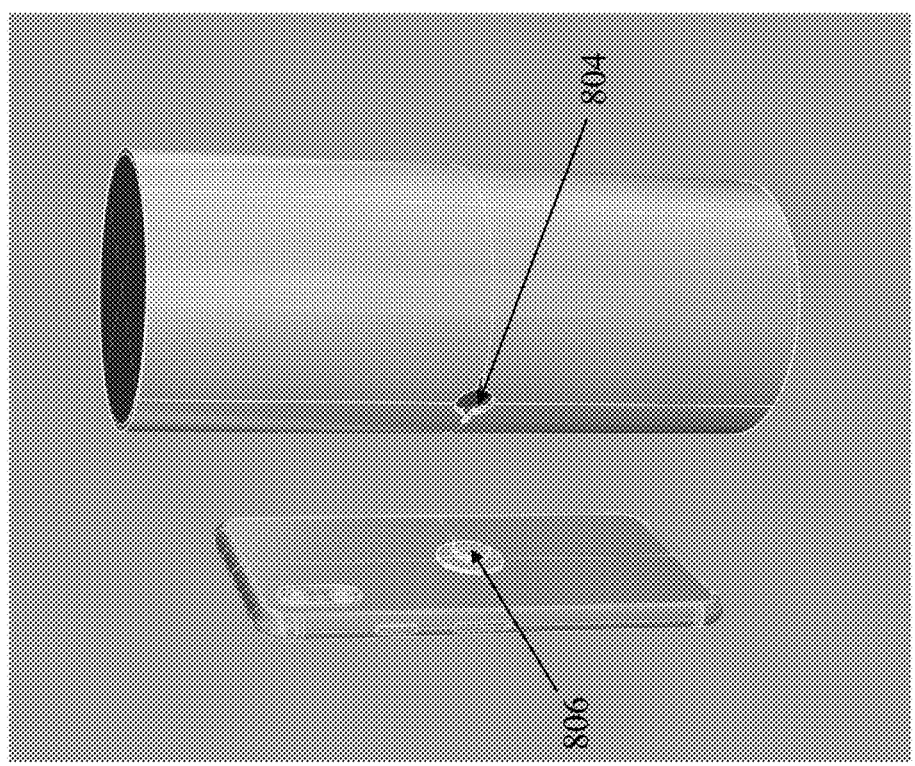
FIG. 8b is a perspective view of a further exemplary embodiment of a cellphone couplable container assembly in accordance with the present invention.
Figure 8A:
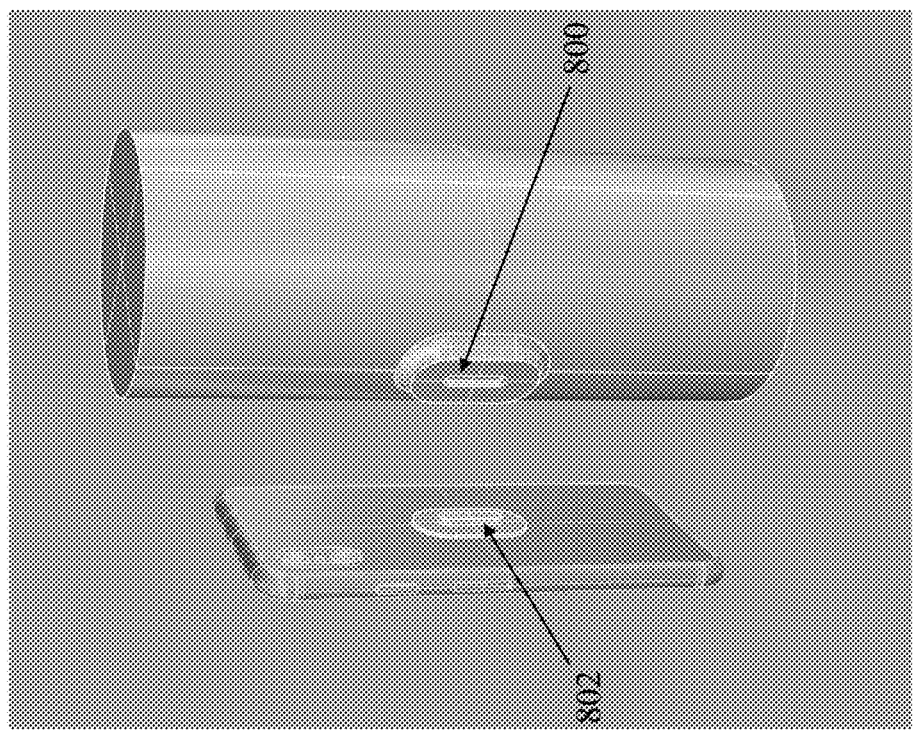
FIG. 8a is a perspective view of a further exemplary embodiment of a cellphone couplable container assembly in accordance with the present invention.

FIG. 8*b* depicts a protruding portion 804 on an outer shell of a container forming a recess corresponding in shape and size to a protruding member on a cellphone support member 806 adhesively coupled to the rear surface of a cellphone. In this embodiment, however, the outer shell of the container, namely the portion defining the recess, may be of a deformable and/or flexible material (e.g., silicon rubber). As such, the circular-shaped protruding member on the cellphone support member 806 may be formed of a flange that can be inserted into the recess by force from the user, whereby the flange and outer shell (namely the compression force thereon) retain the cellphone on the outer shell. The specific dimensions, forms, shapes, and sizes of the protruding portion 804 and the cellphone support member 806 may differ, but their intended function of providing additional structural support to lock the cellphone into place against the outer shell remain the same.

Figure 9B:
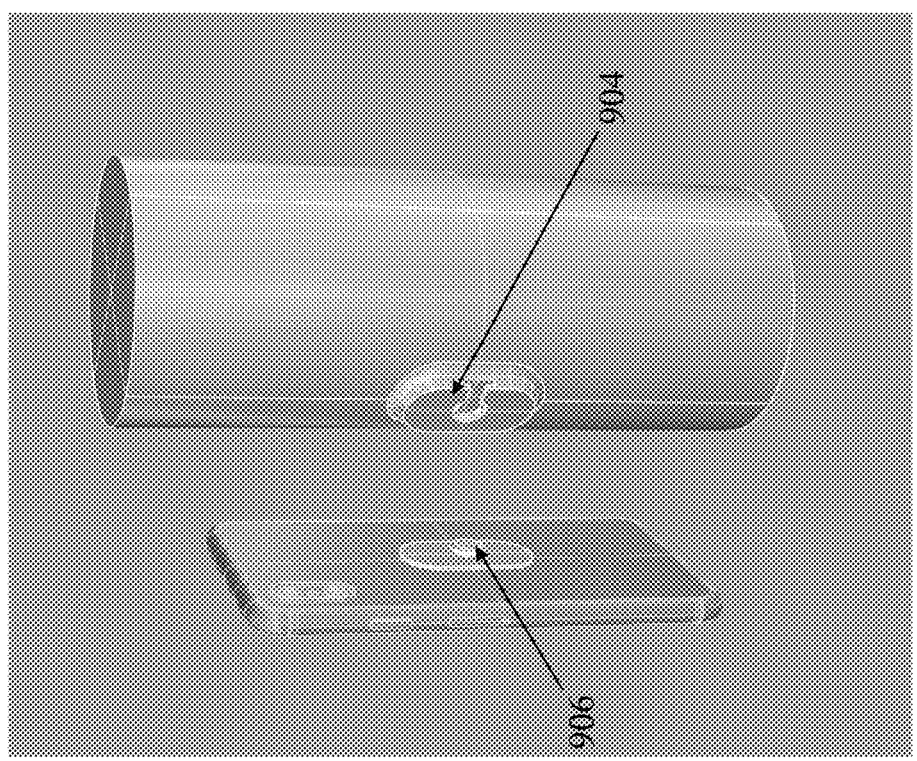
FIG. 9b is a perspective view of a further exemplary embodiment of a cellphone couplable container assembly in accordance with the present invention.
Figure 9A:
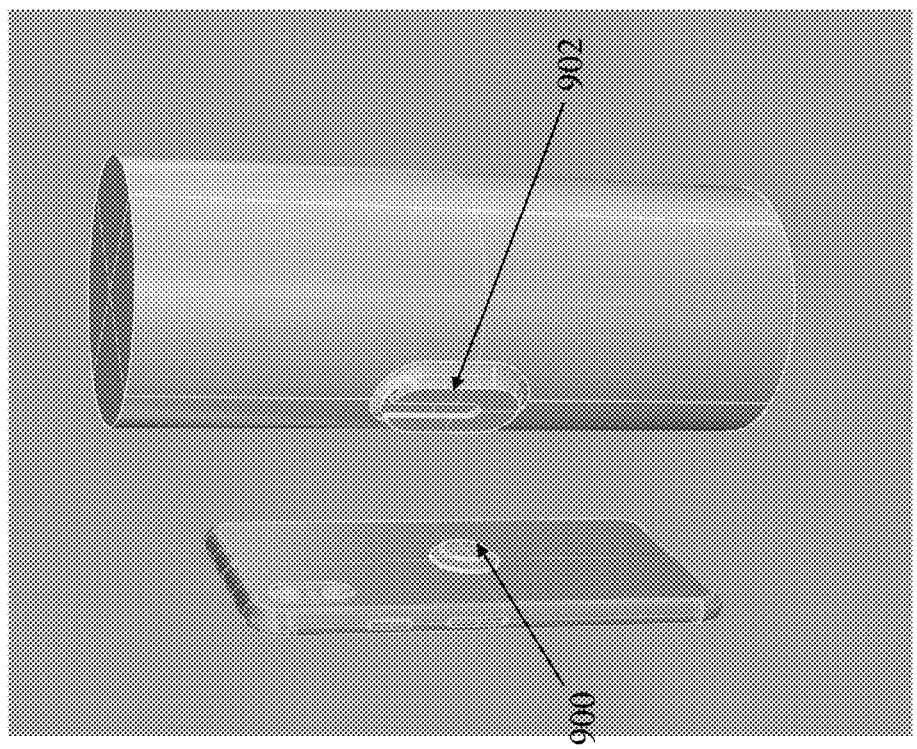
FIG. 9a is a perspective view of a further exemplary embodiment of a cellphone couplable container assembly in accordance with the present invention.

FIGS. 9*a*-9*b* also depict protruding portions 902, 904 on an outer shell of containers forming a recess corresponding in shape and size to a protruding member on cellphone support magnets 900, 906 adhesively coupled to the rear surface of a cellphone. The specific dimensions, forms, shapes, and sizes of the protruding portions 902, 904 and the cellphone support magnets 900, 906 may differ, but their intended function of providing additional structural support to lock the cellphone into place against the outer shell, magnetically, remain the same. As shown in FIGS. 9*a*-9*b*, the protruding portions 902, 904 may include an entrance aperture shaped and sized to receive a flange formed on the cellphone support magnets 900, 906, thereby restricting removal and retention unless slid outwardly from the entrance aperture formed thereon.

Figure 10:
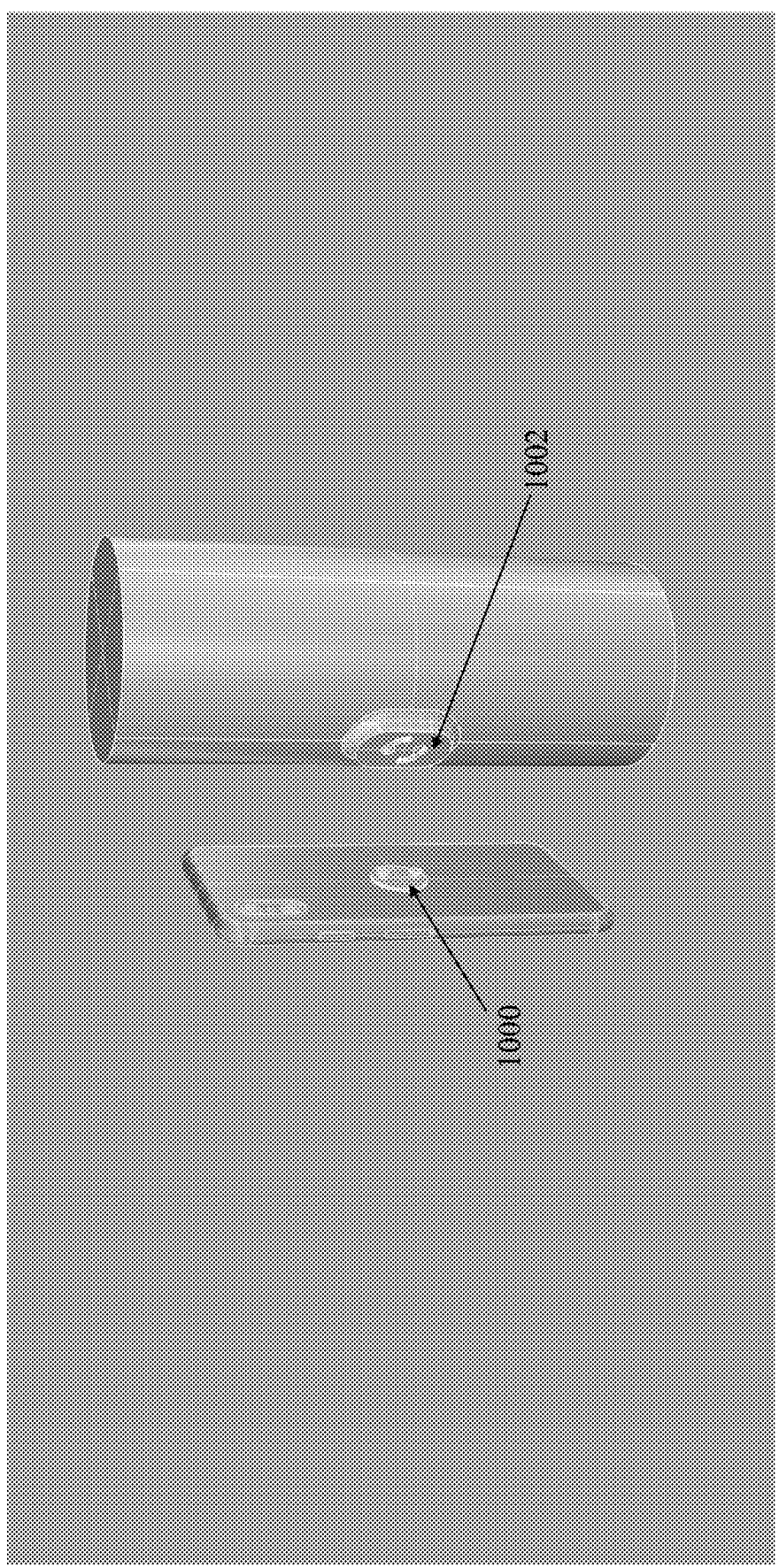
FIG. 10 is a perspective view of a further exemplary embodiment of a cellphone couplable container assembly in accordance with the present invention.

FIG. 10 depicts a protruding portion 1002 on an outer shell of a container forming recesses corresponding in shape and size to a protruding member on a cellphone support member 1000 adhesively coupled to the rear surface of a cellphone. In the embodiment depicted in FIG. 10, the cellphone support member 1000 has two protruding flanges sized to be received within recesses, but that are larger than the channels formed on the protruding portion 1002. The channels formed within the protruding portion 1002 may also have one or more undulations that enable locking of the flanges therein after a certain amount of rotation (enabling locking of the cellphone at desired orientations). The specific dimensions, forms, shapes, and sizes of the protruding portion 1002 and the cellphone support member 1000 may differ, but their intended function of providing additional structural support to lock the cellphone into place against the outer shell remain the same.

Figure 11:
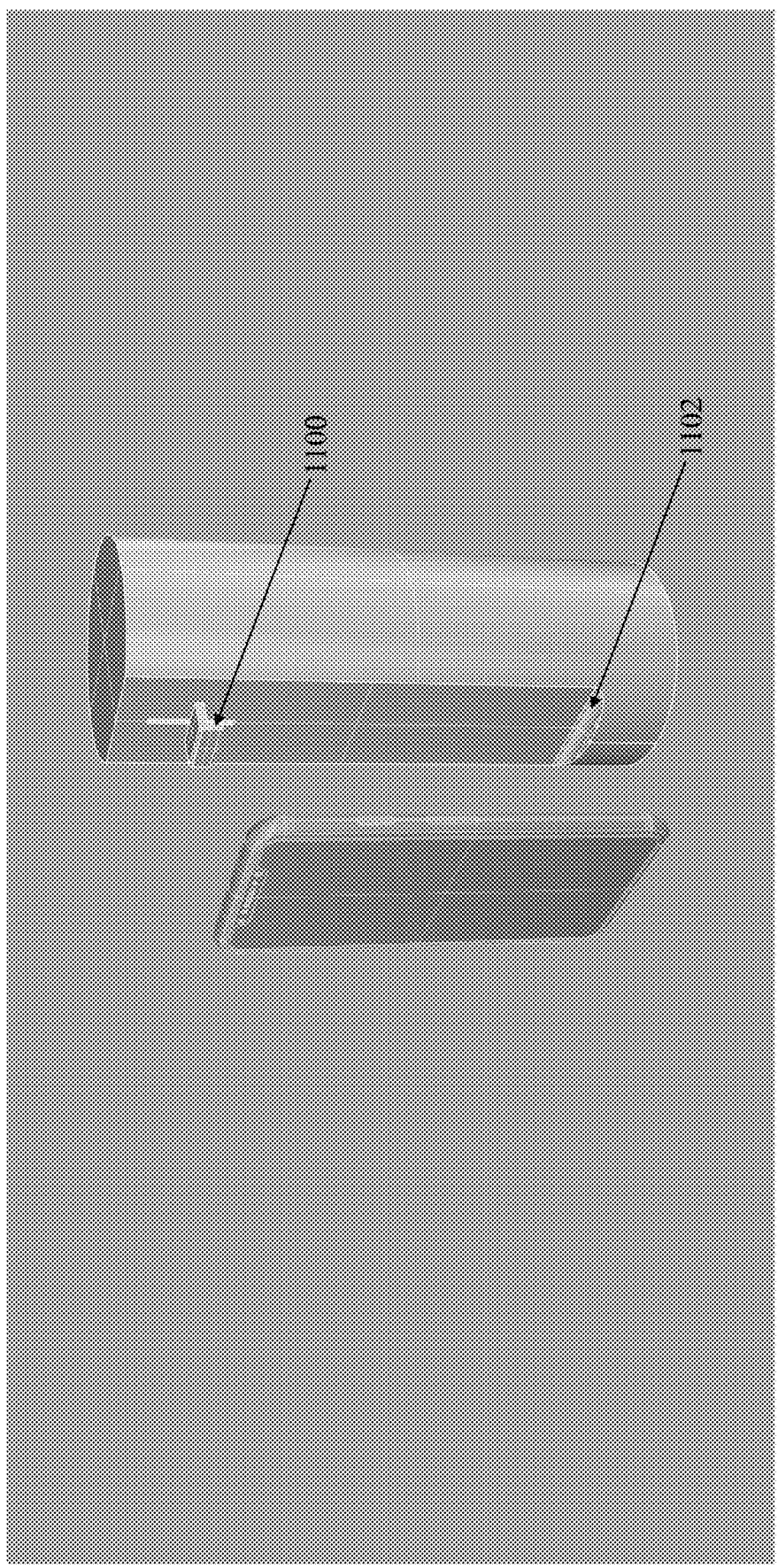
FIG. 11 is a perspective view of a further exemplary embodiment of a cellphone couplable container assembly in accordance with the present invention.

FIG. 11 depicts an L-shaped protruding portion 1100 on an outer shell of a container operably configured to translate and lock thereon after a cellphone is positioned on the outer shell, namely a shelf 1102 formed thereon. The outer shell may have a substantially planar portion and the shelf 1102 may have a concave portion spanning transversely along the outer shell of the container to better retain the cellphone thereon. The specific dimensions, forms, shapes, and sizes of the protruding portion 1100 may differ, but its intended function of providing additional structural support to lock the cellphone into place against the outer shell remains the same.

Figure 12:
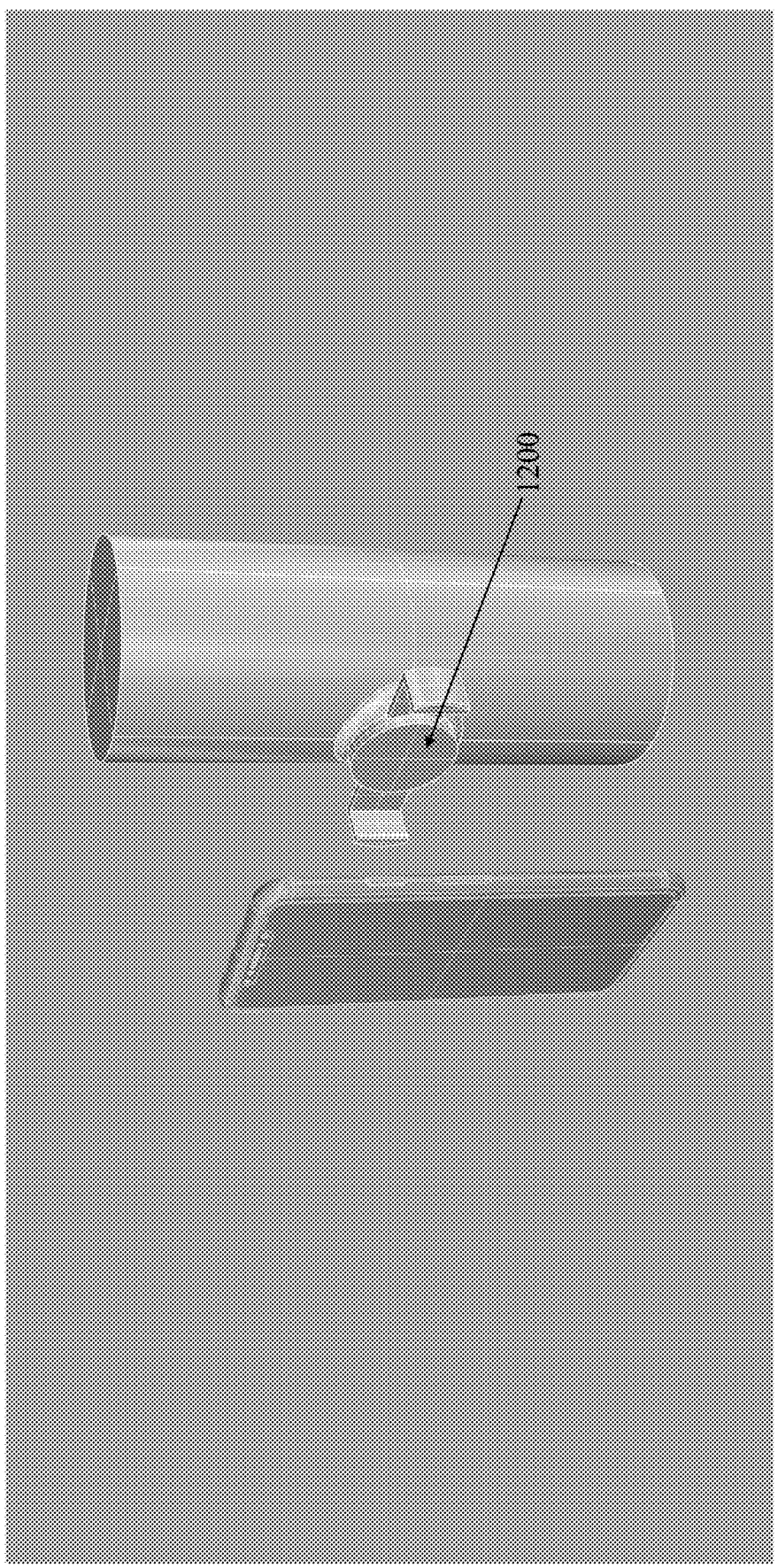
FIG. 12 is a perspective view of a further exemplary embodiment of a cellphone couplable container assembly in accordance with the present invention.

FIG. 12 depicts a selectively adjustable locking arm assembly 1200 rotatably coupled to an outer shell of a container. The locking arm assembly 1200 may include locking arms operably configured to translate and lock onto the cellphone once inserted therein. The specific dimensions, forms, shapes, and sizes of the locking arm assembly 1200 may differ, but its intended function of providing additional structural support to lock the cellphone into place against the outer shell remains the same.

Figure 13:
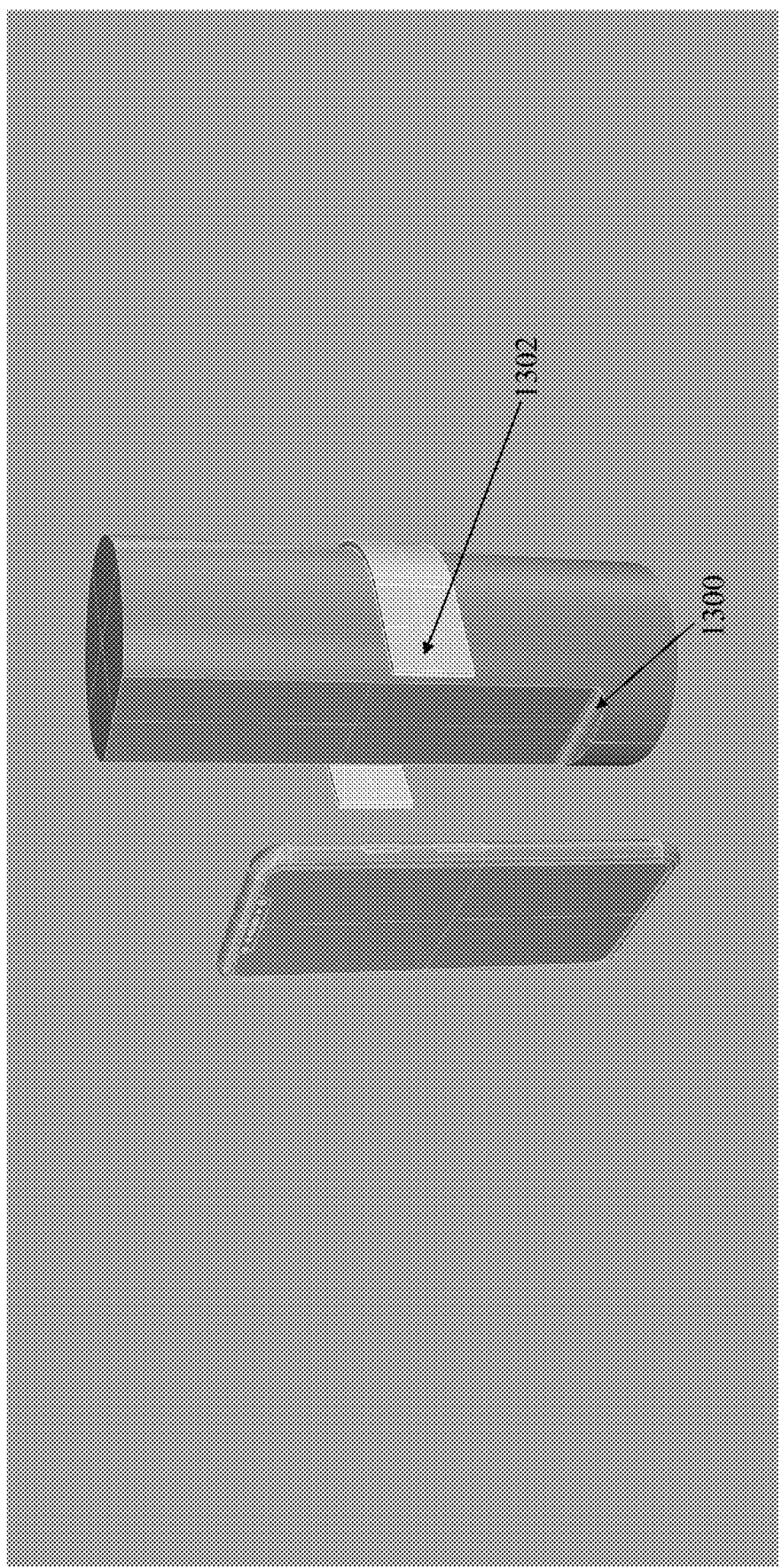
FIG. 13 is a perspective view of a further exemplary embodiment of a cellphone couplable container assembly in accordance with the present invention.
Figure 16:
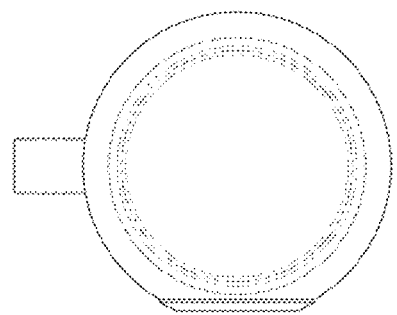
FIGS. 14-17 depict various other views of the cellphone couplable container assembly in FIG. 1, namely a front elevational view, a side elevational view (view is the same from both sides), a bottom plan view, and a top plan view, respectively.
Figure 17:
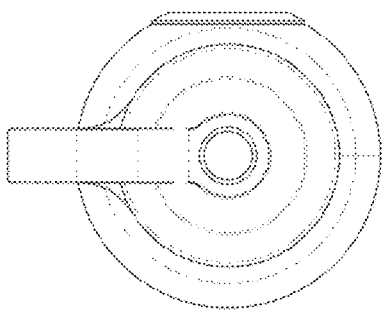
Figure 15:
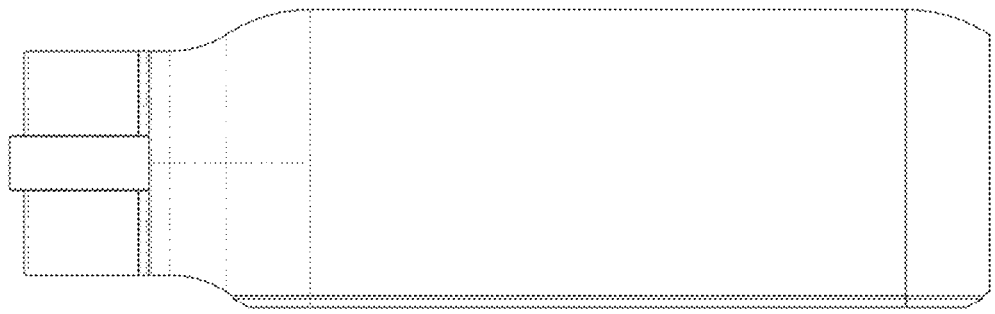
Figure 14:
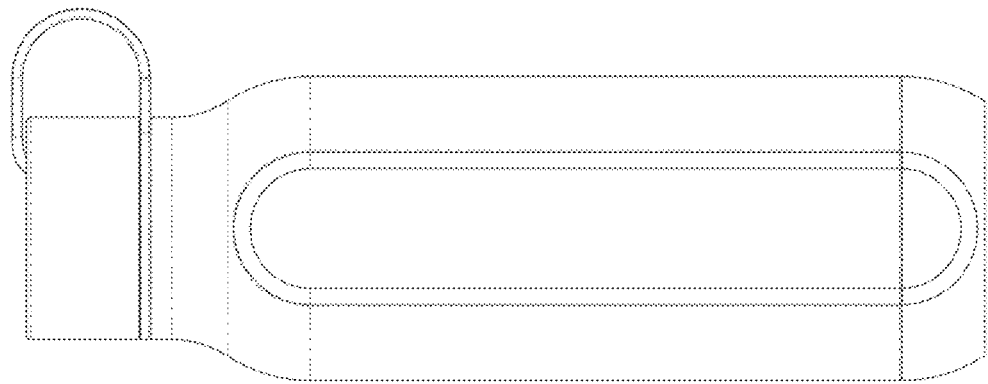

FIG. 13 depicts an outer shell of a container with a substantially planar portion and a shelf 1300 that may have a concave portion spanning transversely along the outer shell of the container. The outer shell includes a flexible strap 1302 operably configured to retain the outer perimeter of a cellphone housing or cover, thereby preventing removal therefrom. The flexible strap 1302 may have flanges disposed on the inner surface thereof to prevent or resist removal of the cellphone. The specific dimensions, forms, shapes, and sizes of the flexible strap 1302 may differ, but its intended function of providing additional structural support to lock the cellphone into place against the outer shell remains the same.

In yet further embodiments of the present invention, the cellphone may be selectively removably couplable to the outer surface of the outer shell using one or more suction cup(s), including nano- or micro-suction cups. As appreciated by those of skill in the art, the one or more suction cup(s) create a vacuum therein that retains the cellphone thereon.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A cellphone couplable container assembly comprising:
an outer shell having a bottom wall and a sidewall surrounding the bottom wall and with an upper end defining an enclosed aperture, the bottom wall and the sidewall defining a container cavity and the sidewall with at least one sidewall magnet directly coupled thereto, of a first polarity, and having a magnetic field generating at least approximately 15 lbf in pull strength;
an inner shell having a sidewall and coupled to the outer shell to define a space between the inner shell and the outer shell, disposed within and defining the container cavity, and of a metallic material;
a sidewall panel with a substantially planar outer surface and with an inner surface, opposing the outer surface of the sidewall panel, and adhesively coupled to the substantially planar surface on the outer surface of the sidewall, the sidewall panel of a non-conductive polymeric material;
a lid selectively removably couplable to the outer shell and operably configured to cover the enclosed aperture and encapsulate, with the outer shell, the container cavity; and
a cellphone magnet with a first side surface having an adhesive disposed thereon and a second side surface opposite the first side surface of a second polarity opposite the first polarity of the sidewall magnet, the cellphone magnet operably configured to be selectively removably coupled to the outer shell through the substantially planar outer surface of the sidewall panel and the at least one sidewall magnet.

2. The cellphone couplable container assembly according to claim 1, wherein:
the sidewall magnet and the cellphone magnet are permanent magnets of a ferromagnetic material.

3. The cellphone couplable container assembly according to claim 2, wherein:
the cellphone magnet is of an annular shape.

4. The cellphone couplable container assembly according to claim 1, wherein the sidewall further comprises:
an outer surface, a lower end opposing the upper end of the sidewall, and a sidewall length separating the lower end and upper end of the sidewall, the outer surface of the sidewall defining a substantially planar surface spanning longitudinally and at least 50% of the sidewall length.

5. The cellphone couplable container assembly according to claim 4, wherein:
the substantially planar surface of the outer surface of the sidewall spans at least 80% of the sidewall length.

6. The cellphone couplable container assembly according to claim 4, further comprising:
a plurality of sidewall magnet cavities defined by and recessed in the outer shell;
at least one sidewall support cavity defined by and recessed in the outer shell; and
a plurality of sidewall magnets each respectively disposed in the plurality of sidewall magnet cavities.

7. The cellphone couplable container assembly according to claim 1, wherein the sidewall panel further comprises:
at least one support protrusion extending outwardly from the inner surface of the sidewall panel, the least one sidewall support cavity sized and shaped to receive the least one support protrusion.

8. The cellphone couplable container assembly according to claim 7, further comprising:
an adhesive transfer tape defining a plurality of cutouts corresponding in shape and size to receive a shape and size of at least one of the plurality of sidewall magnets and the least one support protrusion.

9. The cellphone couplable container assembly according to claim 1, wherein:
the plurality of sidewall magnets are separated from one another to define a sidewall magnet diameter, the cellphone magnet defining a cellphone magnet diameter corresponding to the sidewall magnet diameter.

10. The cellphone couplable container assembly according to claim 9, wherein:
the plurality of sidewall magnets are disposed on the outer shell in an opposing circular configuration and the cellphone magnet is of an annular shape.

11. The cellphone couplable container assembly according to claim 1, wherein:
the bottom wall is selectively removably coupled to the outer shell in a watertight configuration.

12. A cellphone couplable container assembly comprising:
an outer shell having a bottom wall and a sidewall:
surrounding the bottom wall and with an upper end defining an enclosed aperture, the bottom wall and the sidewall defining a container cavity;
with at least one sidewall magnet directly coupled thereto; and with an outer surface, a lower end opposing the upper end of the sidewall, and a sidewall length separating the lower end and upper end of the sidewall, the outer surface of the sidewall defining a substantially planar surface spanning longitudinally and at least 50% of the sidewall length;

an inner shell having a sidewall and coupled to the outer shell to define a space between the inner shell and the outer shell, disposed within and defining the container cavity, and of a metallic material;

a sidewall panel with a substantially planar outer surface and with an inner surface, opposing the outer surface of the sidewall panel, and adhesively coupled to the substantially planar surface on the outer surface of the sidewall, the sidewall panel of a non-conductive polymeric material;

a lid selectively removably couplable to the outer shell and operably configured to cover the enclosed aperture and encapsulate, with the outer shell, the container cavity; and a cellphone magnet with a first side surface having an adhesive disposed thereon and a second side surface opposite the first side surface of a second polarity opposite the first polarity of the sidewall magnet, the cellphone magnet operably configured to be selectively removably coupled to the outer shell through the substantially planar outer surface of the sidewall panel and the at least one sidewall magnet.

13. The cellphone couplable container assembly according to claim 12, wherein:

the at least one sidewall magnet has a magnetic field generating at least approximately 15 lbf in pull strength.

14. The cellphone couplable container assembly according to claim 12, wherein:

the sidewall magnet and the cellphone magnet are permanent magnets of a ferromagnetic material.

* * * * *